United States Patent [19]

Soane

[11] Patent Number: 4,917,455
[45] Date of Patent: Apr. 17, 1990

[54] FIELD-ASSISTED FIBER SPINNING FOR THE PREPARATION OF OPTICAL FIBERS HAVING NON-LINEAR OPTICAL ACTIVITY

[76] Inventor: David S. Soane, 22 Arbor Dr., Piedmont, Calif. 94610

[21] Appl. No.: 98,533

[22] Filed: Sep. 18, 1987

[51] Int. Cl.⁴ .......................... G02B 6/00; G02B 6/10
[52] U.S. Cl. ............................... 350/96.34; 350/96.29; 350/96.30
[58] Field of Search ................ 350/96.29, 96.30, 96.34

[56] References Cited

U.S. PATENT DOCUMENTS 4,720,166 1/1988 Ohmori et al. .................... 350/96.34

OTHER PUBLICATIONS

"Proceedings of SPIE-The International for Optical Engineering", vol. 682, 08/1986.
"Polymer Fiber Waveguides", by Chagulov, Sov. J. Quantum Electron., 12(12), Dec. 1982, American Institute of Physics; Dec. 1982.
"Angewandte Chemie", vol. 23, No. 9, pp. 690–703, Sep. 1984.
"Nonlinear Optical Properties of Organic and Polymeric Materials", Ed–D. J. Williams, ACS Symposium Series 233, American.
R. J. Twieg and K. Jain in "Nonlinear Optical Properties of Organic and Polymeric Materials".
D. J. Williams, ed.-, ACS Symposium Series 233, American Chemical Society, Washington, D.C., 1983, p. 57.
Chemical Society, Washington, D.C., 1983, p. 57.
K. D. Singer, J. E. Sohn, and S. J. Lalama, Appl. Phys. Lett., 49, 248 (1986).
Encyclopedia of Chemical Technology, vol. 10, 3rd Ed., pp. 125–147, John Wiley & Sons, New York, 1980.

Primary Examiner—William L. Sikes
Assistant Examiner—Akm E. Ullah
Attorney, Agent, or Firm—Majestic, Parsons, Siebert & Hsue

[57] ABSTRACT

A method for the preparation of polymer-based optical fibers with nonlinear optical activity using a field-assisted fiber spinning technique has been developed. A homogeneous mixture of high-glass-transition-temperature polymer and a rigid-rodlike noncentrosymmetric molecule with nonlinear optical activity is employed in a specialized fiber-spinning operation. Equivalently, the noncentrosymmetric moieties can be chemically attached to the polymer backbone. A special spinneret is designed in such a manner as to allow a strong electric or magnetic field to be externally applied in the die (extrudate) swell region prior to fiber draw-down. In the die swell region, the imposed electric or magnetic field imparts a preferential orientation to the rod-like molecules (segments), where the molecular dipoles acquire an anistropic spatial orientational accentuated and trapped in fiber draw-down, where the mixture cools and vitrifies. Hence, the final product is nonlinearly-active polymer optical fibers doped with non-centrosymmetric rod-like molecules (segments) whose molecular axis is aligned with the fiber axis. In addition, the alignment is such that the net dipole moment of the system as a whole is non-zero due to the strong electromagnetic field imposed prior to fiber draw-down. This invention is useful in a wide variety of electro-optic and opto-electronic applications.

21 Claims, 9 Drawing Sheets

SHG EFFICIENCY of MAP ANALOGS

| R | R' | | |
|---|---|---|---|
| | H | F | Cl |
| phenyl-CH(CH₃)-NH- | 22 NC | 23 1 | 24 <1 |
| naphthyl-CH(CH₃)-NH- | 25 16 | 26 10 | 27 17 |
| MeO-C(=O)-CH(CH₃)-NH- (MAP) | 8 10 MAP | 28 21 | 29 2 |
| pyrrolidine-CH₂OH | 30 NC | 31 3 | 32 9 |

NC = NOT CRYSTALLINE

MNA ANALOGS

| # | R | POWDER Eff.(X UREA) |
|---|---|---|
| 7 | $NH_2$ (MNA) | 22 |
| 33 | HNMe (MNMA) | 80 |
| 34 | HNEt | 0 |
| 35 | $HNCH(CH_3)_2$ | 0 |
| 36 | $HNCH_2CH_2OH$ | 0 |
| 37 | $HNCH_2CH_2CH_3$ | 0 |
| 38 | $NMe_2$ | 0 |
| 39 | N-pyrrolidinyl | 0 |
| 40 | HN–CH(COOCH$_3$)– | WEAK |
| 41 | HN–CH(Ph)– | 6 |
| 42 | HN–CH(CH$_3$)(1-naphthyl) | WEAK |

BIFUNCTIONAL NITROBENZENES

| # | R | R' | POWDER Eff.(×UREA) |
|---|---|----|--------------------|
| 40 | NH$_2$ | COCH$_3$ | 20 |
| 41 | HNCH$_3$ | COCH$_3$ | WEAK |
| 42 | NMe$_2$ | COCH$_3$ (DAN) | 115 |
| 43 | NMeEt | COCH$_3$ | 2 |
| 44 | N⟨piperidine⟩ | COCH$_3$ (PAN) | 80 |
| 45 | HN–CH(Ph) | COCH$_3$ | 0.7 |
| 46 | NH$_2$ | COCH$_2$CH$_3$ | 10 |
| 47 | NHMe | COCH$_2$CH$_3$ | 5 |
| 48 | NHEt | COCH$_2$CH$_3$ | 0 |
| 49 | NMe$_2$ | COCF$_3$ | 70 |
| 50 | HN–CH(Ph) | [Ar]–N(succinimide) | 8 |

Nonlinear Nitropyridines

| # | R | R' | | Powder Eff. (x urea) |
|---|---|---|---|---|
| 51 | NO$_2$ | | Cl | 5 |
| 52 | NO$_2$ | | OH | 5 |
| 53 | NO$_2$ | | O–Ph | 7 |
| 54 | NO$_2$ | (+,–) | NH–CH(CH$_3$)–Ph | 4 |
| 55 | NO$_2$ | (–) | NH–CH(CH$_3$)–Ph | 7 |
| 56 | NO$_2$ | (–) | NH–CH(CH$_3$)–COOCH$_3$ | 3 |
| 57 | NO$_2$ | (–) | NH–CH(CH$_3$)–naphthyl | 16 |
| 5 | H | (+ or –) | NH–CH(CH$_3$)–Ph (MBA-NP) | 25/25 |
| 58 | H | | NH–CH(CH$_3$)–COOCH$_3$ | 1 |
| 59 | H | | O–naphthyl | 5 |
| 60 | H | (–) | NH–CH(CH$_3$)–naphthyl | 2 |
| 61 | H | (+,–) | 3-hydroxypiperidinyl | 5 |
| 62 | H | (–) | 2-(hydroxymethyl)pyrrolidinyl (PNP) | 160 |
| 63 | Me | (–) | NH–CH(CH$_3$)–Ph | 7 |
| 64 | Me | (–) | NH–CH(CH$_3$)–naphthyl | 25 |

FIGURE 10
(PRIOR ART)
THIAZOLE and PYRIMIDINE DERIVATIVES

| R | # | $O_2N$-thiazole-R Eff | # | $O_2N$-pyrimidine-R Eff |
|---|---|---|---|---|
| HN-CH(CH$_3$)-phenyl | 65 | 8 | 66 | 4 |
| HN-CH(CH$_3$)-naphthyl | 67 | 0.1 | 68 | 2 |
| HN-CH(CH$_3$)-CH(CH$_3$)$_2$ | 69 | WEAK | 70 | 1 |
| HN-CH(COOCH$_3$)-CH$_3$ | 71 | 3 | 72 | <1 |

FIELD-ASSISTED FIBER SPINNING FOR THE PREPARATION OF OPTICAL FIBERS HAVING NON-LINEAR OPTICAL ACTIVITY

BACKGROUND OF THE INVENTION

1. Field of the Invention

The present invention relates to polymer-based optical fibers posessing non-linear optical activity. The organic or inorganic optical fiber prepared by the method described herewith exhibits electro-optic activity and frequency-doubling capability in addition to serving standard light transfer and data transmission functions.

2. Description of the Technical Background of the Invention

The advent of semiconductor GaAs lasers with a fundamental wavelength between 0.8 and 1.5 micrometer represents a major technological breakthrough. However, the long wavelength of such sources has limited the utility of semiconductor lasers. A non-linear optical material that generates higher harmonics from monochromatic inputs with long wavelengths will find a variety of practical applications, such as in electrophotography, optical switching and scanning, and mass data storage, and integrated optoelectronics, among others. These applications have stimulated considerable efforts toward the understanding and manufacture of nonlinear optical material. Polymers enter into the field as hosts for dispersed small molecules that possess non-linear optical properties.

The fundamental concepts of non-linear optics can be easily understood in mathematical terms. In the dipolar approximation, the polarization induced in a chemical structure (atom or molecule) by an external field E may be represented by the following equation:

$$P = \alpha E + \beta EE + \gamma EEE \tag{1}$$

where the vector quantities P and E are related by the tensorial quantities, $\alpha$, $\beta$, and $\gamma$ (referred to as the polarizability, hyperpolarizability, and second hyperpolarizability, ... etc.) These latter quantities depend on the detailed architecture and electronic dispersion of the various parts of the chemical species under study, and are microscopic (molecular) properties. When individual molecules aggregate to form macroscopic samples, the polarization induced by an external field in the bulk media may be expressed by the following equation as:

$$P = \chi^{(1)}E + \chi^{(2)}EE + \chi^{(3)}EEE + \tag{2}$$

where the microscopic properties $\alpha$, $\beta$, and $\gamma$ are replaced by the corresponding macroscopic quantities $\chi^{(1)}$, $\chi^{(2)}$, $\chi^{(3)}$ ... (the first, second, third ... harmonic coefficients).

Organic molecules that are conjugated and polarized, i.e., containing electron donor and acceptor pairs oppositely positioned, exhibit appreciable molecular hyperpolarizability, $\beta^{(1)}$. A simple example is p-nitroaniline, which possesses strong electron-withdrawing and donating groups spaced by an aromatic ring. When an incoming electromagnetic wave interacts with such a noncentrosymmetric entity, the wave form is distorted (rectified) in such a manner that the output comprises significant components of higher harmonics.

The mere existence of molecular noncentrosymmetry does not guarantee that macroscopic samples exhibit nonzero non-linear optical coefficients, e.g., $\chi^{(2)}$. The spatial arrangement of the molecules must meet the condition that macroscopically the sample remains noncentrosymmetric as well. Equivalently, the dipole moments of the molecules must have a preferred alignment. Unfortunately, due to energetic considerations, most substances condense into a configuration where the dipole moments are antiparallel. Hence, molecular non-linearity is cancelled in bulk samples.

It was not until the first "poling" experiments were performed that the situation began to improve. Poling is, in essence, molecular alignment induced by a high imposed direct current (dc) electric field. This externally applied field imparts a preferred orientation to the dopants in a polymer matrix at high temperatures. Quenching freezes in place, this externally induced alignment, as the high viscosity of the vitrified matrix preserves the orientation. However, only electro-active and frequency-doubling thin films have been prepared in this fashion. In addition, the effectiveness of dipole alignment by the poling process is limited. The specific system investigated in the poling experiment in the literature used an azo dye (Disperse Red 1, 4-[N-ethyl-N-(2-hydroxyethyl)] amino-4'-nitroazobenzene) as the nonlinear optic dopant, and PMMA as the amorphous host polymer. Aside from the observed second harmonic generation, such polymeric host-guest systems possess good film-forming properties, which may qualify them for integrated optics application.

In the present invention, a method and device for the preparation of optical fibers having distinct nonlinear optical properties is disclosed. The preparation technique involves a specially designed fiber spinner which exploits the combined electric and/or magnetic-field-induced and elongation-flow-induced orientation of doped noncentrosymmetric molecules (or chemically attached noncentrosymmetric moieties). This combined electromagnetic/flow field approach results in efficient rod alignment with a high degree of directional anisotropy. The end products are optical fibers with the rigid-rod-like noncentrosymmetric species aligned parallel to the fiber axis while retaining a preferred dipole orientational anisotropy. Such optical fibers are expected to become a significant force in the emerging field of optoelectronics.

SUMMARY OF THE INVENTION

In one aspect the present invention concerns an elongated optical fiber defining an axis comprising a polymer and a dipolar dopant wherein a predominance of the dipoles of the dopant are oriented in essentially the same direction along the axis of the fiber.

In another aspect, the invention concerns a method of forming an optical fiber defining an axis, the fiber having a dipolar dopant wherein a substantial number of the dipoles of the dopant are oriented in essentially the same direction along the axis of the fiber; the method including the following steps:

(a) providing a vessel having a spinneret;

(b) establishing a substantially constant electric (or magnetic) field adjacent to, axially aligned with and downstream of the spinneret;

(c) forming a prefiber homogenous liquid mixture of at least one dipolar dopant and at least one polymer in the vessel;

(d) extruding the prefiber through the spinneret;

(e) drawing the extrudate through the electric (or magnetic) field to generally align the dipoles in the same direction; and (f) elongating simultaneously by drawing the extrudate after it has left the spinneret and while it is still in a fluid state.

In a third aspect, the present invention relates to the elongated optical fiber provided by the above method.

In still another aspect, the present invention relates to a device for forming optical fibers with nonlinear optical activity comprising:

a vessel having a spinneret plate, means for establishing an electric (or magnetic) field adjacent to and downstream from the vessel, said field axially aligned with the spinneret, and means for drawing an elongated fiber from said spinneret and through the charged field.

BRIEF DESCRIPTION OF THE FIGURES

FIGS. 5-10 show typical organic nonlinear materials which are useful as dopants as reported and described by R. J. Twieg and K. Jain in "Organic Materials for Optical Second Harmonic Generation", Chapter 3, of *Nonlinear Optical Properties of Organic Polymeric Materials*, edited by David J. Williams, American Chemical Society Symposium Series, Vol. 233, Washington, D.C., published in 1983, the entire chapter and book of which is incorporated herein by reference.

DETAILED DESCRIPTION OF THE INVENTION AND PREFERRED EMBODIMENTS

Definitions

Figure 1:
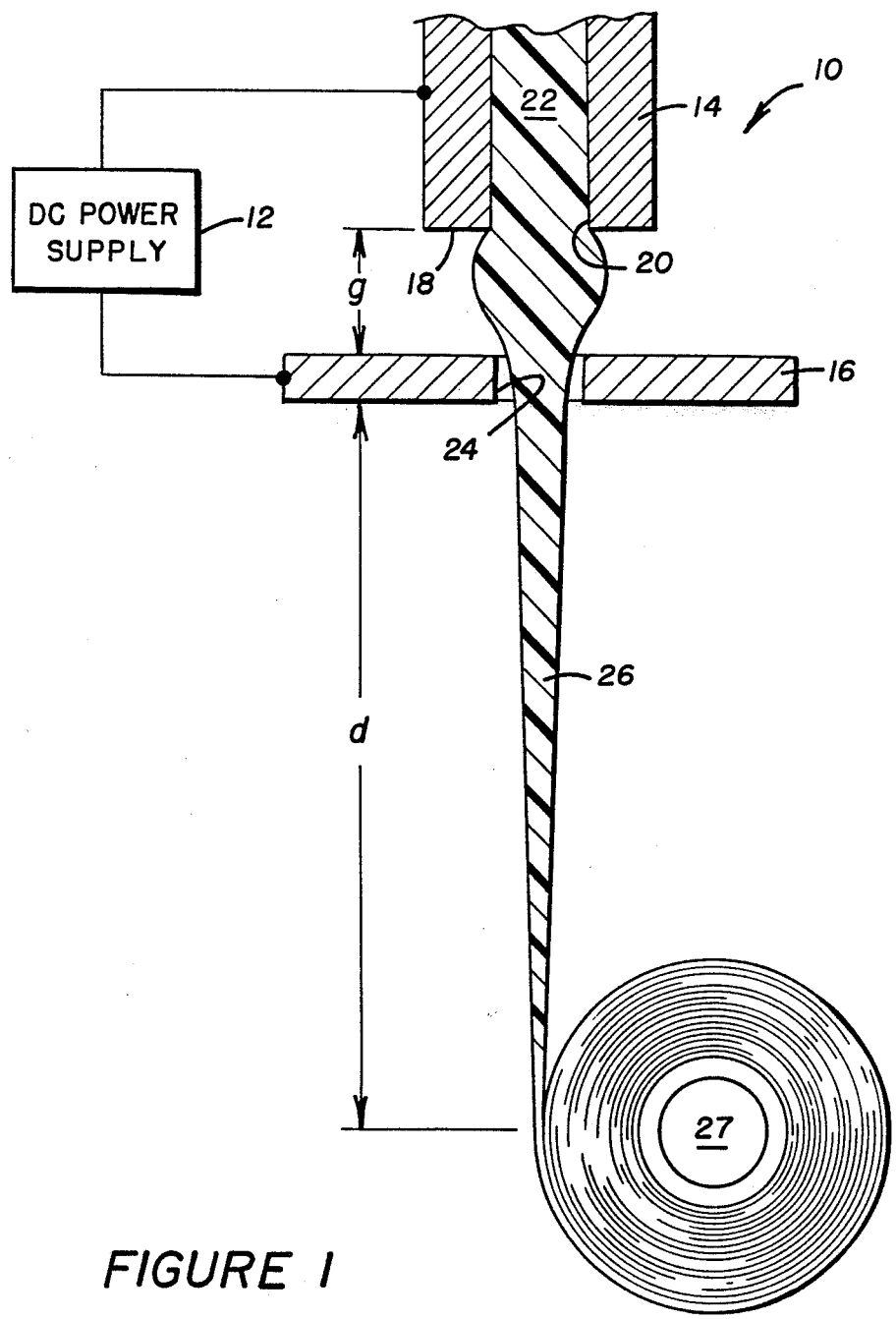
FIG. 1 shows a schematic of the physical configuration of the vessel, spinneret, orifice plate, polymer, fiber and reel.

As used herein: "Dopant" refers to dipolar organic compound, an inorganic compound, an organometallic compound, or mixtures thereof.

"Halogen", refers to fluoro, chloro, bromo or iodo groups. Preferably, fluoro, chloro, or bromo groups are selected.

"Inorganic polymer" includes all varieties of optical glass, silicon carbide, silicon nitride, poly(silicates) or mixtures thereof.

"Organic dopant" refers to but is not limited to the compounds independently selected from the following:
  nitrobenzene;
  substituted nitrobenzene;
  aniline;
  substituted aniline;
  p-substituted naphthalene;
  p-substituted anthracenes;
  polarized enones;
  4-nitroaniline;
  pyridine;
  substituted pyridine;
  substituted thiazole;
  purine;
  pyrimidene;
  halobenzene;
  halotoluene, or mixtures thereof.

Also see FIGS. 5-10 for additional examples of dopants as discussed by Twieg and Jain, supra.

"Organic polymer" includes but is not limited to the following polymers independently selected, or as physical mixtures, or as copolymers of each other from:
  polyacetal;
  poly(carbonate);
  poly(phenylene oxide);
  poly(phenylene sulfide);
  poly(methylstyrene);
  poly(acrylonitrile);
  poly(acrylic acid);
  poly(etheretherketone);
  poly(methylmethacrylate) (PMMA);
  poly(ethylene terephthalate);
  poly(ethylene);
  poly(propylene);
  poly(butadiene);
  poly(ethylene oxide);
  poly(isobutylene);
  poly(propylene oxide);
  poly(N-vinylcarbazole);
  poly(vinylchloride);
  poly(vinylidene chloride);
  poly(oxymethylene);
  poly(amides) (also known as nylon);
  polyesters;
  poly(fluoroethylenes);
  poly(fluorolefins);
  poly(organosilicone) or mixtures thereof.

Preferred polymers are those prepared by a vinyl addition. More preferred polymers include, for example, poly(acrylonitrile), poly (vinylchloride), poly(acrylates), poly(methylacrylates) and the like.

"Prefiber material" refers to the mixture of the dopant and polymer. The ratio of the components (dopant/polymer) may vary over a broad range, from 0.1/99.9% up to just below the phase separation concentration (i.e., the concentration at which the dopant separates from the polymer.) Normally this concentration ratio (dopant/polymer) is between about 0.1/99.9 and 80/20. Preferably the ratio is between about 0.1/99.9 and 50/50. More preferably the ratio is between about 0.1/99.9 and 20/80.

"Subsituted" refers to organic compounds, preferably aromatic compounds in which at least one of the hydrogens has been replaced by polar substituent. A polar substituent is one which either contributes or withdraws electron density to increase the dipole moment of the organic component. Suitable polar substituents include but are not limited to those selected from nitro, amino, hydroxyl, carboxymethyl, halogen or ester groups, i.e. —C(=O)—$R^2$, where $R^2$ is alkyl having from 1 to 6 carbon atoms preferably, alkyl having from 1 to 4 carbom atoms. Aromatic compounds generally have 1 to 3 polar substituents.

The elongated inorganic polymeric fibers can be selected from various poly(silicates) and poly(silicates) with controlled impurities of phosphorous, boron or other inorganic elements and doped with lithium niobate.

"Polymer" refers to an organic polymer, an inorganic polymer, an organometallic polymer, or mixtures thereof. The mixtures may be either physical mixtures of the polymers or may be block, random, or ordered copolymers.

Traditional fiber spinning is a process in which the fiber-forming fluid is continuously extruded through an orifice (spinneret). The cross-section of the fiber is determined by the orifice geometry. The invention detailed here is not limited to any particular fiber cross-section. The material extruded out of the spinneret is wound up by a rotatinq take-up roll. The tangential speed at the rim of the take-up roll determines the fiber draw ratio, which is a measure of the final fiber diameter compared to the orifice diameter. Between the spinneret and the take-up roll, the fluid sustains an appreciable elongational deformation. Polymers (hosts) as well as rigid-rod-like molecules (guests or dopants) (or rigid-rod-like side branches often termed side-chain mesogens) tend to be aligned in the stretch direction. However, the rod-like species with noncentrosymmetry will adopt a 50/50 distribution of dipole alignment upstream and downstream. Equivalently stated, the molecular dipole moments of the rods will cancel one another due to the statistically anti-parallel alignment, leaving a zero net dipole moment in the sample. In order for the optical fiber to possess nonlinear activity, the dopant rods must have an unequal directinal distribution along the fiber axis, i.e., there must be a preferential orientation of the aligned rod. The noncentrosymmetric rods must line up with their individual dipoles pointing primarily in one direction of the fiber.

A key feature of the present invention and associated equipment design is the recognition that the conventional 50/50 distribution of upstream and downstream alignment can be significantly perturbed by an externally imposed charged electric field either electrostatic o electromagnetic in the region immediately following the nozzle of the spinneret. This region is known as the die (extrudate) swell region. Fluid flow is minimal and the polymer mixture just emerges from the capillary of the spinneret, where it has undergone a shear deformation. In the die swell region, shear-induced stresses begin to relax. As a result, the rods tend to rotate and assume an orientation orthogonal to the fiber axis. Thus, orthogonal (or oblique) orientations strongly favor the field-assisted alignment process. Hence, most rods now tilt either upstream or downstream depending on the field direction applied to the system. The draw region immediately following the die swell region involves a strong uniaxial extensional (elongational) flow, where the polymer is stretched significantly and transforms to the final, slender fiber. The die swell region is thus a transitional region, which bridges between a shear and an elongational domain. Fluid residence time in the die swell region is comparatively long, and the rod orientation is thus appreciably influenced by an externally applied electrostatic or magnetic field. Orientation is achieved by virtue of the intrinsically anisotropic nature of the noncentrosymmetric rods. Electrical interaction is afforded by the non-zero molecular dipole moments, whereas magnetic interaction stems from the inherent anisotropic magnetic susceptibility of the rods.

FIG. 1 shows a schematic of a physical embodiment of the novel device 10 designed specifically for the manufacture of non-linear optical fibers. A direct current power supply 12 provides a constant electric potential in the die swell region in the form of a dc field between a spinneret 14 and an orificed plate 16 positioned parallel to and downstream of the spinneret nozzle face 18. A small gap g separates the nozzle 20 and the plate 16. The polymer-rod mixture 22 (or rod-tagged polymer) is fed into the spinneret from upstream by standard means. The mixture 22 can be a melt, or a solution, whose temperature is so chosen that the mixture is in a fluid state and rod rotation in the polymer is facile. The electric field strength is dictated by the rate of rod rotation at the processing temperature and the fluid residence time in the die swell region or gap g. The rods are endowed with a preferred directional distribution in a gap g after the fluid emerges from the nozzle 20, but before it reaches the plate, by the strong electric field maintained between the spinneret nozzle face 18 and the orifice 24 in plate 16. The fluid never touches the orifice plate 16, so the only effect plate 16 exerts on the fluid is electrical. Molecular orientation is achieved within gap g between nozzle 20 and plate 16. Spinneret 14 and orifice plate 16 are electrically isolated from each other, and a strong dc field is maintained by a powerful dc voltage source 12 during the entire fiber spinning operation. Upon exiting this field-permeated die swell region in gap g, the polymer experiences a strong elongational flow in the draw-down region d. The preferred rod orientation is further accentuated by extension-induced tilting and alignment. It may be appropriate to include means to second electrostatic or electromagnetic field below the die swell region in the draw down region d. The melt also cools and vitrifies. If the starting mixture is dissolved in a solvent, the solvent evaporates or is leached out, hardening the mixture. The final vitrified drawn-down fiber is wound up by the take-up roll 27. Within the fiber are well-aligned rods with a definite dipolar directionality. The dipoles either preferentially point upstream or downstream, dependng upon the elctric field direction.

Figure 4:
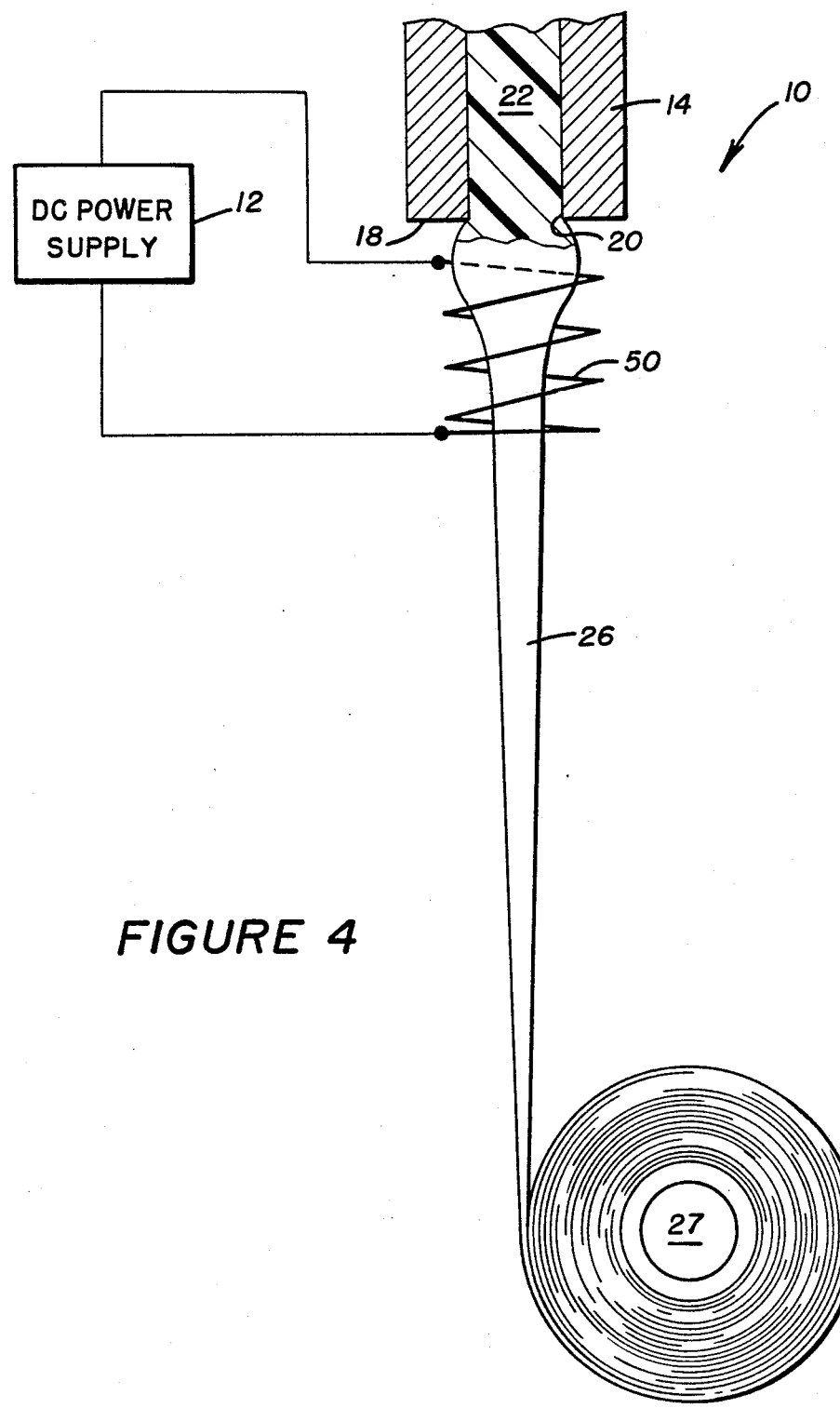
FIG. 4 is a schematic of an alternate embodiment of the structure shown in FIG. 1.
Figure 5:
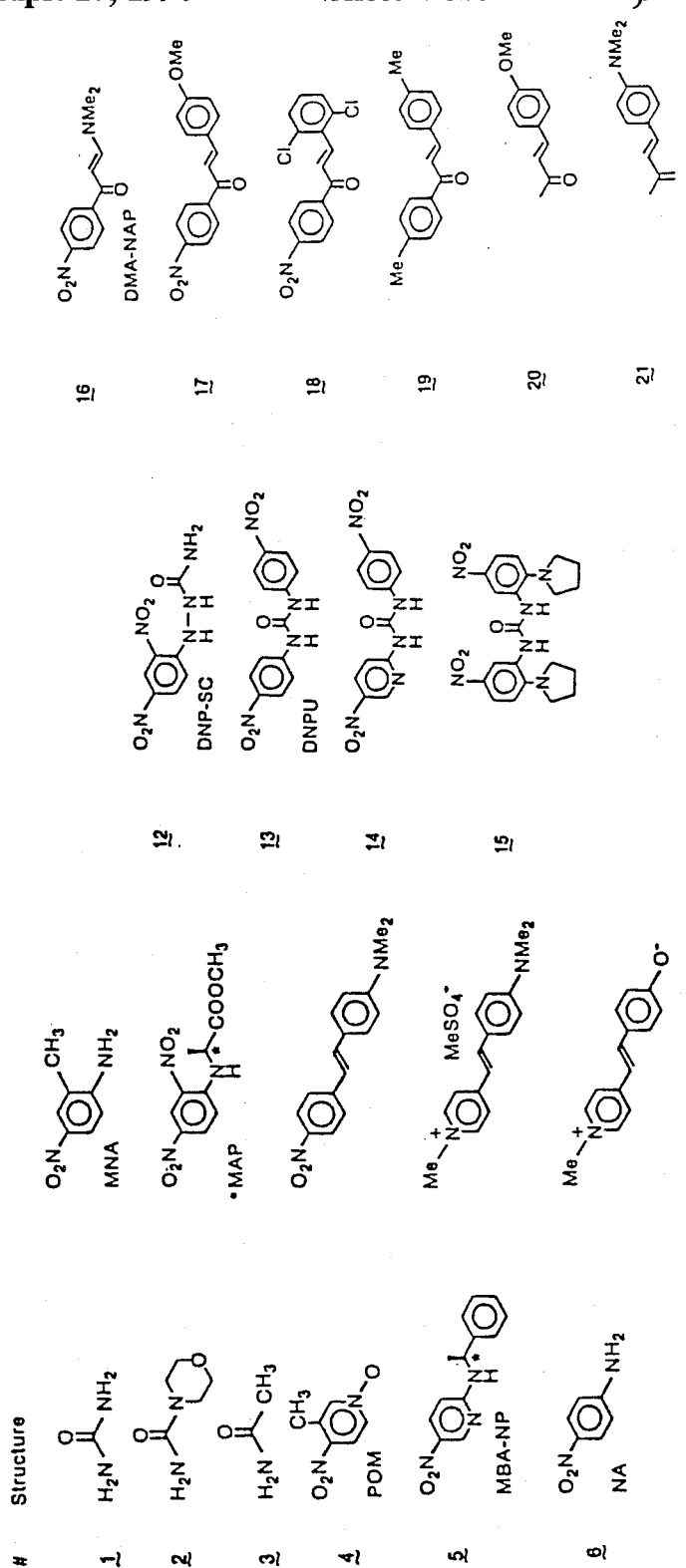
Figure 6:
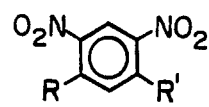
Figure 7:
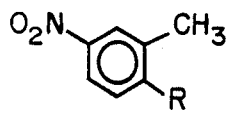
Figure 8:
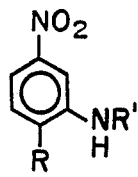
Figure 9:
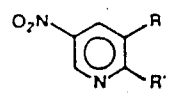

Referring now to FIG. 4, a second embodiment is shown wherein orificed plate 16 is replaced by a magnetic field established by one or more coils (known as Helmhottz coils) 50 positioned at the die swell region or gap g of FIG. 1. The axis of the coil or coils is, of course, coincident with the axis of the extruded fiber so that the magnetic field lines of force will be coaxial with the fiber. Here again, a dc power supply is needed to establish the relatively strong magnetic field parallel to the extrudate. The magnetic field acts in a similar manner as the electric potential described above to align the rods as they pass through the die swell region.

Figure 2:
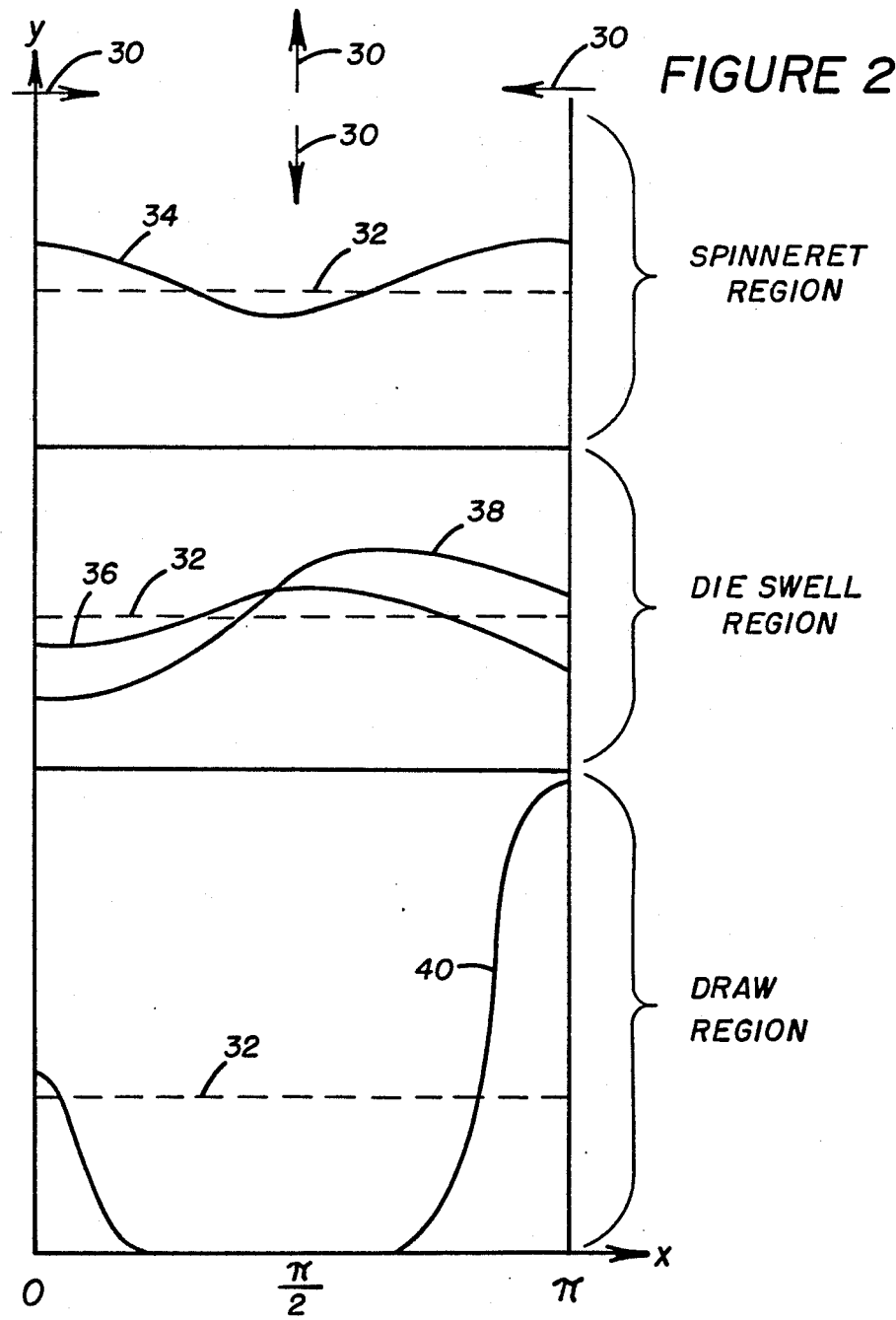
FIG. 2 shows a graph of the dipole orientation distribution of the dopant in the polymer in the spinneret region, in the die swell region, and in the drawing (elongation) region.

Referring to FIG. 2, the orientation of the rods or dipoles in the extrudate is schematically illustrated at the various areas of the device 10. Distribution of the orientation of rods is shown from $0(0°$ C.) to $\pi$ (180°.) It is assumed that the axis of the fiber 26 is used as the reference axis from which the angle $\theta$ is measured. The rod orientation is represented by arrows 30, with parallel orientation at 0 and antiparallel at $\pi$ (pi) and orthogonal orientation at $\pi/2$. The normal or completely random distribution of rod orientation is represented by the dashed lines 32.

Curve 34 is representative of the rod orientation that would be found at spinneret orifice 20. At this point, the majority of the rods are oriented either in the 0 or $\pi$ direction, but with a large share having other orientations, and a minority either in the $\pi/2$ (90°) direction.

In the "die swell" region, gap g of FIG. 1, there is a tendency for the rods to rotate toward the $\pi/2$ orientation that is orthogonal or oblique to the fiber axis, as illustrated by curve 36. However, if an electric or magnetic field is imposed on the fiber, which at this point is still fluid, the rods will tend to orient in the same direction as the field. This is the orientation illustrated by curve 38. It should be noted that there is still a large share of the rods that have an oblique or orthogonal orientation.

The bottom curve 40 shows the result of the drawing or elongation of the fiber in region d (FIG. 1). While some rods remain adversely oriented, the predominance of the rods are oriented in the same direction with few or none being oblique or orthogonal to the axis of the fiber. It is obvious that without the imposition of the electric field, curve 40 would be symmetrical.

Figure 3:
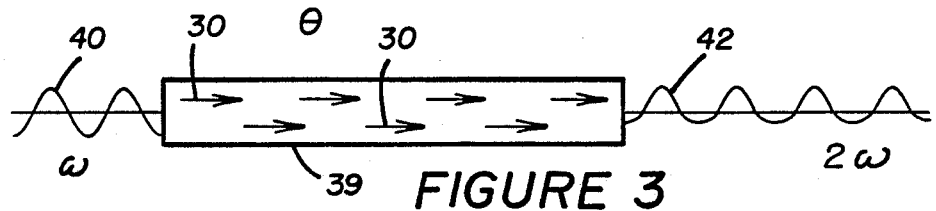
FIG. 3 is a schematic of a vitrified portion of the non-linear optical fiber showing the light wave of frequency ($\omega$) entering the polymer tube having a oriented dipolar dopant and the increased frequency ($2\omega$).

FIG. 3 is a schematic of a vitrified portion of the nonlinear optical fiber 39 again with the orientation of the rods shown by arrows 30. Again, schematically, an incoming electromagnetic wave (light) 40 is directed toward one end of fiber 39. The wave, if coherent, would have a frequency $\omega$. As it passes axially along fiber 39, its wave form is changed to that represented by wave 42. As is well known, wave 42 can be represented by a Fourier series in the form:

$$\Sigma A_n e^{-in\omega}$$

where each element is a harmonic of the basic frequency $\omega$. As shown above the dominant harmonic other than the fundamental in this environment is the $2\omega$ harmonic thus providing the nonlinear nature of the fiber.

In addition to second harmonic generation, such optical fibers with oriented dipoles trapped within may find uses in piezoelectric sensing. The piezoelectricity derives from the aligned nature of the dipoles. When the spacing between the dipoles is deformed by fiber stretching during sensing piezoelectricity is induced. Such optical fibers can thus be utilized for sensitive vibrational detection. Alternatively, the second harmonic generation property is affected by in-use fiber stretching, allowing sensitive detection of mechanical deformation.

Optimization of nonlinear optical activity can be accomplished by adjustments of the following system and process variables: the chemistry/structure of noncentrosymmetric dopant rods or side branches, the relative composition of the rods and the polymer hosts, the host rheological properties, the optical transparency of the host, the glass transition temperature, molecular weight and chain architecture of the host, the feed temperature, the draw ratio, the cross-air speed, and most of all the field strength, orifice diameter and the gap setting between the nozzle and the plate.

The following Examples are intended to be illustrative and exemplary only, and are not to be construed to be limiting in any way or fashion.

Starting materials are used as provided without further purification by standard chemical or polymer suppliers. Chemicals and polymers are available from Aldrich Chemical Company, Milwaukee, Wisconsin or by consultation of *Chemical Sources*, published annually by Directories Publications, Inc. of Columbia, S.C.

GENERAL EXPERIMENTAL PROCEDURE

This fiber spinning process for the preparation of nonlinear optical fibers is illustrated by the following example. The feed is a high-glass-transition-temperature amorphous, clear, thermoplastic polymer, such as but not limited to poly(methylmethylacrylate), polycarbonate, poly(styrene), poly(methylstyrene), poly(acrylic acid), poly(methacrylic acid), and poly(ethyleneterephthalate). (Also included are inorganic polymers such as poly(silicate oxide).) The dopant rods are exemplified, by but not limited to substituted nitrobenzenes, substituted diarylureas, polarized enones, nitroaniline derivatives, nitropyridine derivatives, substituted thiazoles and pyrimidines, among others.

A mixture of rods (guests or dopants) and polymer(s) (hosts) is first made by melt or solution blending. Alternatively, the rods are chemically linked to the polymer backbone by a number of standard chemical fixing procedures. The feed is heated and thermally regulated by standard means. It is delivered to spinneret 14, again by standard means. The spinneret is specially constructed in accordance with the schematic depicted in FIG. 1 or FIG. 4 and described above. The electric field strength is adjusted by the gap g and dc power supply voltage output as appropriate. Fluid residence time in the die swell region (gap g between the orifice plate 16 and spinneret nozzle 20) is adjusted by the gap setting, feed flow rate, and fiber draw ratio (take-up roll speed). Cross flow air is used to remove heat (and/or solvent) from the fiber after is passes through plate orifice 24 or coil 50, causing vitrification before fiber take-up on a conventional reel 27. Optical transparency is ensured in feed resin selection, polymer purity maximization, suppression of crystallization and phase separation. Mechanical property requirements are also met by judicious host selection, such as its molecular weight, chain architecture, and glass transition temperature. Impact strength and fatigue limit may be improved by including random copolymers as hosts. Such engineering property optimization is well known in standard plastics industry and available to one skilled in this art.

EXAMPLE 1

Fabrication of an Oriented Organic Dipolar Dopant in an Organic Polymer (a) An example operating condition is given below. A mixture having a concentration below phase separation, 5% in this example of 1,4-[N-ethyl-N-(2-hydroxyethyl)-]amino-4'-nitroazobenzene (Aldrich Chemical Co., Milwaukee, Wisc.) in poly(methylmethacrylate), (Rohm & Haas Co., Philadelphia, Pa.), is introduced into the specially constructed spinneret at 160° C., a temperature selected such that the system is a melt but below the decomposition temperature of the rods and/or the polymer. The spinneret nozzle has a diameter of one millimeter (mm), one half a mm downstream is a circular orifice of 0.8 mm. The orifice plate 16 and the nozzle 20 are electrically isolated by air, teflon gaskets, sleeves, nuts and bolts, and other requisite mechanical parts (not shown) for electrical feed through and grounding. The plate 16 is either positively or negatively biased at 100 kV. When coil 50 is used to establish a magnetic field, the current flow through the coil should be relatively constant to maintain a constant field with lines of force parallel to the extruded fiber. The fluid does not touch the plate 16. When it emerges from the orifice plate 16, the fiber is drawn by a takeup roll 26 placed downstream. The draw speed is 1 m/s. Physical limitations set forth above may vary as shown in the acompanying table:

TABLE

| | |
|---|---|
| Spinneret Nozzle Diameter | 0.1 mm–1 cm |
| Plate Separation (gap g) | 0.1 mm–10 cm |
| Orificed Plate-Orifice | 0.1 mm–1 cm |
| Electric Potential | 1 kv–100 kv |

TABLE-continued

| Draw Speed | 0.1 m/s to 500 m/s |
|---|---|

(b) Similar procedures are devised for the production of nonlinear optical fibers with different specifications. For example, Example 1(a) is repeated several times, except that the poly(methylmethacrylate) is replaced by an equivalent weight of poly(carbonate), poly(styrene), poly(ethylene), or poly(ethyleneterphthalate), the corresponding polymer fiber having oriented dipoles is expected to be produced.

(c) Similarily, when Example 1(a) is individually repeated several times, except that the 1,4-[N-ethyl-N-(2-hydroxyethyl)]amine-4'- nitroazobenzene is replaced by 4-nitroaniline.

The corresponding polymeric poly(methylmethacrylate) fiber having oriented dipoles is expected to be produced.

While some embodiments of the present invention have been shown described herein, it will be apparent to those skilled in the art that various modifications and changes can be made in the method of manufacture of optical fibers having nonlinear optical acitvity, the device for manufacturing the optical fibers and the optical fibers themselves, without departing from the spirit and scope of the present invention. All such modifications and changes coming within the scope of the appended claims are intended to be covered thereby.

I claim:

1. An elongated optical fiber defining an axis comprising a polymer and a dipolar dopant wherein a predominance of the dipoles of the dopant are electromagnetically and mechanically oriented in essentially the same direction along the axis of the fiber, wherein the ratio of dopant to polymer is between about 0.1/99.9 and 80/20 percent by weight.

2. The elongated optical fiber of claim 1 wherein fiber comprises materials selected from organic materials, inorganic materials or mixtures thereof.

3. The elongated optical fiber of claim 1 wherein the dopant comprises noncentrosymetric compounds selected from organic compounds, inorganic compounds, organometallic compounds, or mixtures thereof.

4. The elongated optical fiber of claim 2 wherein the fiber consists essentially of an organic material.

5. The elongated optical fiber of claim 4 wherein the organic polymer material is independently selected from the following polymers:
poly(acetal);
poly(carbonate);
poly(styrene);
poly(phenylene sulfide);
poly(phenylene oxide);
poly(phenylene sulfide);
poly(methylstyrene);
poly(acrylonitrile);
poly(acrylic acid);
poly(etheretherketone);
poly(methacrylic acid);
poly(methylmethacrylate) (PMMA);
poly(ethylene terephthalate);
poly(ethylene);
poly(propylene);
poly(butadiene);
poly(ethylene oxide);
poly(isobutylene);
poly(propylene oxide);
poly(N-vinylcarbazole);
poly(vinyl acetate);
poly(vinyl chloride);
poly(vinylidene chloride);
poly(oxymethylene);
poly(amides) (also known as nylons);
poly(esters);
poly(fluoroethylenes);
poly(fluoroolefins);
poly(organosilicone); or mixtures thereof.

6. The elongated optical fiber of claim 2 wherein the fiber consists essentially of an inorganic material.

7. The elongated optical fiber of claim 6 wherein the inorganic polymer is independently selected from:
poly(silicates);
poly(phosphazenes);
poly(silicon nitrides);
poly(silicon carbides);
poly(silicon borides);
poly(silicates with controlled impurities of phosphorous or boron or mixtures thereof.

8. The elongated optical fiber of claim 3 wherein the dopant is a dipolar organic compound.

9. The elongated optical fiber of claim 8 wherein the dipolar organic compound is independently selected from:
nitrobenzene;
substituted nitrobenzene;
aniline;
substituted aniline;
p-substituted naphthalene;
p-substituted anthracenes;
substituted diarylurea;
polarized enones;
4-nitroaniline;
pyridine;
substituted pyridine;
substituted thiazole;
purine;
pyrimidine;
halobenzene;
halotoluene; or from mixtures thereof.

10. The elongated optical fiber of claim 5 wherein the dipolar organic compound is independently selected from:
nitrobenzene;
substituted nitrobenzene;
aniline;
substituted aniline;
p-substituted naphthalene;
p-substituted anthracenes;
substituted diarylurea;
polarized enones;
4-nitroaniline;
pyridine;
substituted pyridine;
substituted thiazole;
purine;
pyrimidene;
halobenzene;
halotoluene; or mixtures thereof.

11. The elongated optical fiber of claim 3 wherein the dopant is a dipolar inorganic compound.

12. The elongated optical fiber of claim 7 wherein the dopant is lithium niobate.

13. The elongated optical fiber of claim 1 wherein the polymer and dipolar dopants are solution blended.

14. The elongated optical fiber of claim 1 wherein the polymer and dipolar dopants are chemically linked.

15. The elongated optical fiber of claim 1 wherein the polymer and dipolar dopants are melt blended.

16. The elongated optical fiber of claim 1 wherein the polymer and dipolar dopants are copolymerized.

17. An elongated optical fiber defining an axis comprising a polymer and dipolar dopant, the ratio of dopant to polymer between about 0.1/99.9 and 80/20 percent by weight, wherein the predominance of the dipoles of the dopant are oriented in essentially the same direction along the axis of the fiber.

18. The elongated optical fiber of claim 17 wherein the polymer and dipolar dopants are solution blended.

19. The elongated optical fiber of claim 17 wherein the polymer and dipolar dopants are chemically linked.

20. The elongated optical fiber of claim 17 wherein the polymer and dipolar dopants are melt blended.

21. The elongated optical fiber of claim 17 wherein the polymer and dipolar dopants are copolymerized.

* * * * *